US010489253B2

(12) United States Patent
Battle et al.

(10) Patent No.: US 10,489,253 B2
(45) Date of Patent: Nov. 26, 2019

(54) ON-DEMAND GPR ECC ERROR DETECTION AND SCRUBBING FOR A MULTI-SLICE MICROPROCESSOR (71) Applicant: INTERNATIONAL BUSINESS MACHINES CORPORATION, Armonk, NY (US)

(72) Inventors: Steven J. Battle, Austin, TX (US); Joshua W. Bowman, Austin, TX (US); Sundeep Chadha, Austin, TX (US); Dhivya Jeganathan, Austin, TX (US); Cliff Kucharski, Austin, TX (US); Dung Q. Nguyen, Austin, TX (US); Tu-An T. Nguyen, Austin, TX (US); David R. Terry, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 289 days.

(21) Appl. No.: 15/596,818

(22) Filed: May 16, 2017

(65) Prior Publication Data
US 2018/0336108 A1 Nov. 22, 2018

(51) Int. Cl.
G06F 11/00 (2006.01)
G06F 11/16 (2006.01)
G06F 9/30 (2018.01)
G06F 9/38 (2018.01)

(52) U.S. Cl.
CPC ...... G06F 11/1666 (2013.01); G06F 9/30141 (2013.01); G06F 9/3836 (2013.01)

(58) Field of Classification Search
CPC .......................... G06F 11/2028; G06F 11/3024

USPC ........................................................ 714/10
See application file for complete search history.

(56) References Cited

U.S. PATENT DOCUMENTS

| 7,447,948 B2 | 11/2008 | Galbi et al. |
| 9,081,501 B2 | 7/2015 | Asaad et al. |
| 9,454,451 B2 | 9/2016 | Campbell |
| 2002/0120647 A1* | 8/2002 | Amano ............... G06F 17/2217 715/234 |
| 2011/0302450 A1* | 12/2011 | Hickey ............... G06F 11/1641 714/17 |

(Continued)

OTHER PUBLICATIONS

"Using a common Error on Correcting Special Purpose Register for correcting errors in a register file," Disclosed Anonymously, IP.com No. IPCOM000202463D, IP.com Electronic Publication Date: Dec. 16, 2010.

(Continued)

Primary Examiner — Sarai E Butler
(74) Attorney, Agent, or Firm — Patterson + Sheridan, LLP (57) ABSTRACT Embodiments include systems, methods, and computer program products for on-demand error detection and correction of registers in a processor. One method includes detecting, before a first instruction is dispatched to an issue queue in the processor, an error in data, associated with the first instruction, stored in an entry of a register file in the processor. The method also includes, after detecting the error, halting the dispatch of the first instruction to the issue queue, and determining whether the entry of the register file has completed. The method further includes determining whether to perform error correction on the register file based on the determination of whether the entry of the register file has completed.

20 Claims, 6 Drawing Sheets (56) References Cited

U.S. PATENT DOCUMENTS

| | | | | |
|---|---|---|---|---|
| 2013/0073921 A1* | 3/2013 | Kamoshida | ............ | H03M 13/11 |
| | | | | 714/758 |
| 2013/0326309 A1* | 12/2013 | Yoneda | ................... | G06F 11/10 |
| | | | | 714/763 |
| 2015/0254135 A1* | 9/2015 | Chatradhi | ........... | G06F 11/1076 |
| | | | | 714/764 |
| 2016/0004587 A1 | 1/2016 | Agrawal et al. | | |
| 2016/0065243 A1* | 3/2016 | Patterson | ............ | G06F 9/30145 |
| | | | | 714/752 |
| 2017/0185476 A1* | 6/2017 | Wu | ..................... | G06F 11/1068 |

OTHER PUBLICATIONS

"Using instructions initiated by RAM Mode and common dataflow to correct single bit errors in a Register File protected by Error Correction Code," Disclosed Anonymously, IP.com No. IPCOM000202464D, IP.com Electronic Publication Date: Dec. 6, 2010.

"Decoupled Soft Error Handling in Microprocessor," Disclosed Anonymously, IP.com No. IPCOM000238405D, IP.com Electronic Publication Date: Aug. 25, 2014.

Daniel Henderson, Jim Mitchell, and George Ahrens, IBM Server and Technology Group, "POWER® System RAS Key Aspects of Power Systems™ Reliability, Availability, and Serviceability," Aug. 30, 2010, 55 pages.

\* cited by examiner

ON-DEMAND GPR ECC ERROR DETECTION AND SCRUBBING FOR A MULTI-SLICE MICROPROCESSOR

BACKGROUND

The present disclosure generally relates to error correction in data processing systems, and more specifically, to on-demand detection and correction of errors in register files in a processor.

In a processor, data may be stored in register files for processing instructions. Error detection and correction may be performed on the data. When an error is detected, an error correction process is initiated. Often, an error correction process requires a processing pipeline to be halted while the error is corrected. This results in lost processing time for the processor. In existing implementations, data operands stored in register files are read and checked for errors after instructions are issued by an issue queue. The issue queue tracks instructions with the use of instruction tags associated with each instruction. When an error is detected, processing is halted but the issue queue and processing logic must continue to track the status of instructions in progress. Unique data paths may also need to be implemented to transmit the data to an appropriate portion of the core for error correction processing. In addition, error correction is performed for the entire register file regardless of the completion state of the data. However, these operations are inefficient and complex.

SUMMARY

One embodiment presented herein includes a method for on-demand error correction in a processor. The method generally includes detecting, before a first instruction is dispatched to an issue queue in the processor, an error in data, associated with the first instruction, stored in an entry of a register file in the processor. The method also includes, after detecting the error, halting the dispatch of the first instruction to the issue queue, and determining whether the entry of the register file has completed. The method further includes determining whether to perform error correction on the register file based on the determination of whether the entry of the register file has completed.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments described herein disclose techniques for performing on-demand error detection and correction of registers in a processor (e.g., such as a multi-slice processor).

Generally, errors in data stored in register files such as general purpose registers (GPRs) or vector register files (VRF) can be corrected using an issue queue (ISQ) as a staging path to detect and initiate an error correction process to scrub the register files. When an instruction is dispatched, the source RF (e.g., GPR) entries required as input for the instruction are read from the register file and sent to the reservation station. In addition, the GPR data is checked against the error correcting code (ECC) bits (in the GPR entry) for errors. In conventional error correction techniques, when an error in the data is detected, an error correction process is initiated regardless of whether the GPR data is still in-flight or in an architected state (e.g., "completed"). Such error correction processes generally involve reading out the entire GPR and scrubbing the entries to fix any errors, which can be significantly time-consuming and reduce the performance of the processor. For example, while the error correction process is undergoing, the processor is generally prevented from fetching new instructions (e.g., from an instruction cache).

As described below, however, in many cases, depending on whether the GPR entry has been completed, there may be (older) valid data associated with the GPR entry stored elsewhere in the processor. Thus, in many cases, it may not be necessary to perform error correction every time an error is detected. In one embodiment, rather than initiate an error correction process every time an error is detected, the processor may determine (e.g., on-demand) whether to perform error correction based on whether the GPR data (in which the error is detected) has been completed. For example, if an error on the GPR data is detected and the GPR entry has already completed, then an error correction process can be initiated to correct the error. In such a case, a pervasive unit in the processor can initiate a special state machine to read out the GPR data and ECC bits for scrubbing.

On the other hand, if the GPR entry has not yet been completed, then the processor may refrain from initiating the error correction procedures. In such cases, the valid architected GPR data may still be in the history buffer (HB), and thus, this valid data can be restored from the history buffer (via a flush request) to the GPR, as opposed to reading out the entire GPR and performing scrubbing to fix errors. In this manner, the processor can restore the valid GPR data and resume execution as usual without going through a time consuming ECC scrubbing process.

Note, to clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
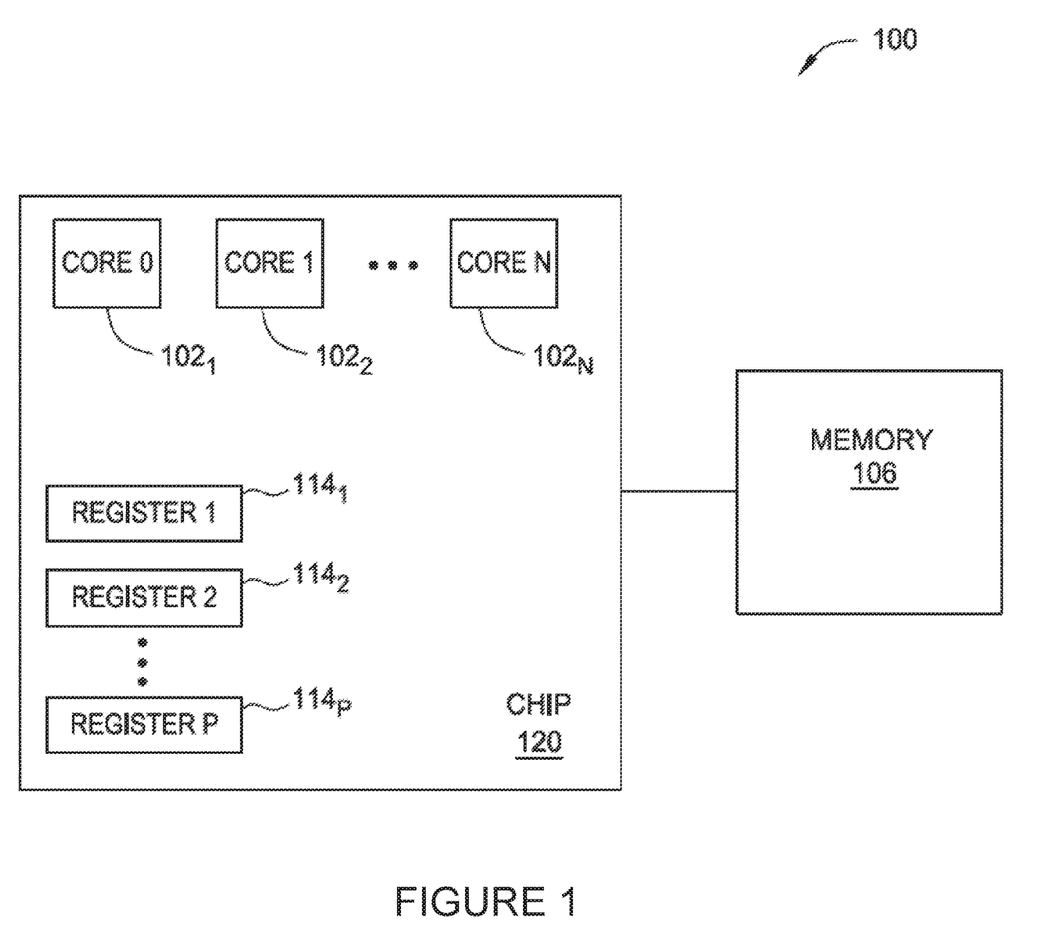
FIG. 1 illustrates a computing system for performing on-demand error correction, according to one embodiment.

FIG. 1 illustrates a computer system 100 that can be configured to perform on-demand error correction, according to one embodiment. The computer system 100 includes a chip 120 that includes one or more processor cores 102, shown as Core 1, Core 2, . . . , Core N. Embodiments described herein may utilize any number N of processor cores. In other embodiments, components of system 100 shown as on chip 120 may be located off the chip, and components of system 100 shown as off chip 120 may be located on the chip.

Computer system 100 also includes memory 106. Memory 106 may include a random access memory (RAM), a read-only memory (ROM), an erasable programmable read-only memory (EPROM or Flash memory), an optical storage device, a magnetic storage device, or any suitable combination of the foregoing. Memory 106 is operable to store data that may be retrieved for computing operations. Memory 106 may also include memory that is on chip 120 and/or within cores 102.

Computer system 100 also includes registers 114. Embodiments described herein may utilize any number P of registers 114, and each register 114 may be any length. Registers 114 store bits of information that can be read out or written. Registers 114 may be vector registers, general purpose registers, special purpose registers, or any other suitable register type. Although illustrated outside of cores 102 in FIG. 1, one or more registers 114 may be located within the cores 102. Each core 102 may include one or more execution/processing slices for multithreading operation. The execution slices may include an execution pipeline as described in further detail below. The pipelines represent multiple sequential steps for executing multiple computer instructions in parallel—e.g., a register load, add, copy, etc. To execute the computer instruction, the pipelines may send requests to store data in, or read data from, the registers 114. As described in further detail below, computer system 100 performs error correction on data stored in registers, such as GPRs, utilizing the components of the execution pipeline.

Figure 2:
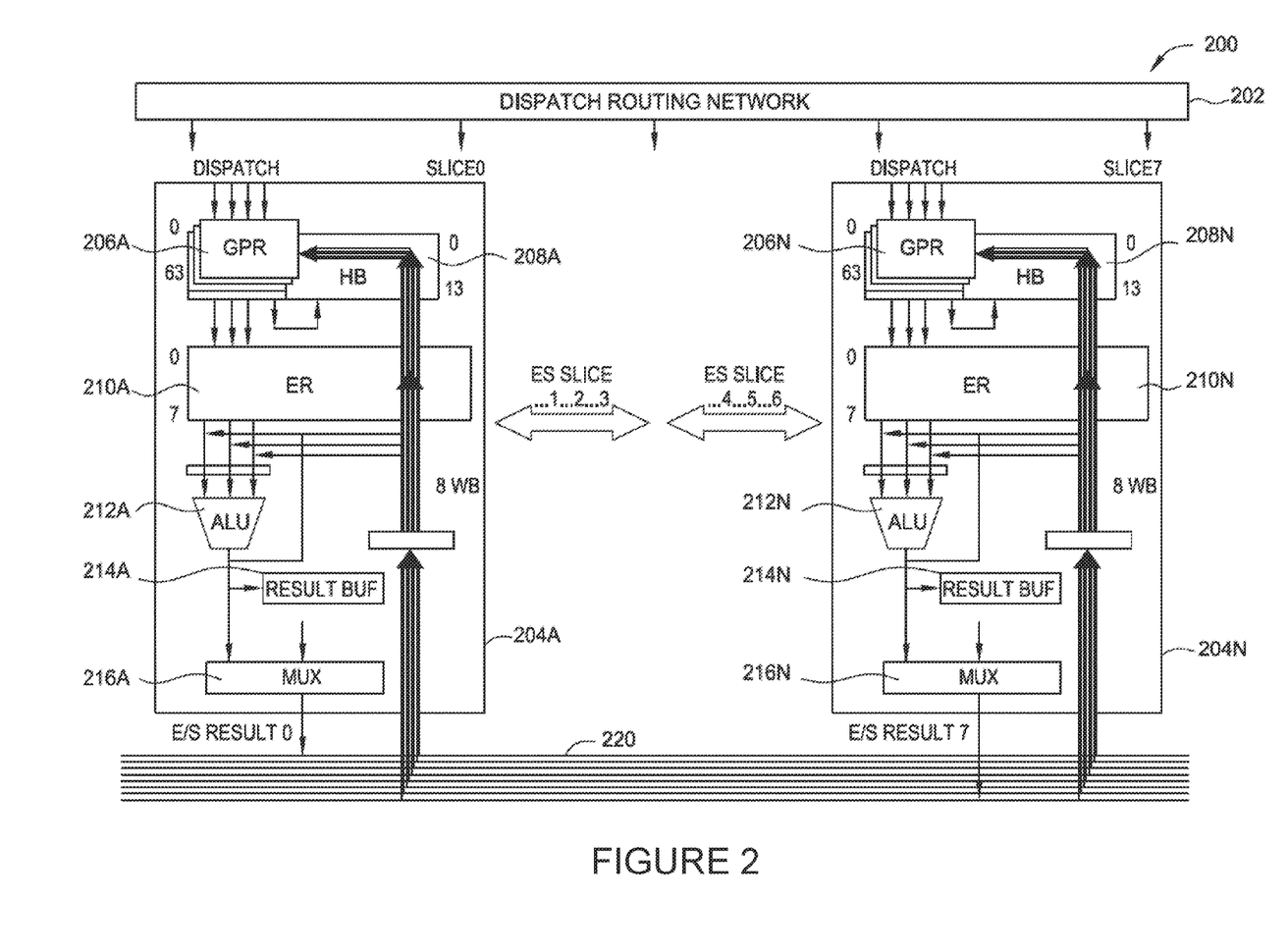
FIG. 2 illustrates an example multi-slice processor configured to perform on-demand error correction, according to one embodiment.

FIG. 2 illustrates an example processing system 200 within a core 102 of a multi-core computer processor. In this example, eight execution slices (Slice0 to Slice7) operate in parallel (referred to as execution slices 204). Slice0 204A and Slice7 204N are illustrated in detail. Any number of slices may be present in other embodiments. A fetch unit (not illustrated) fetches instructions from an instruction cache or memory (also not shown) and sends the instructions to a dispatch routing network 202. The dispatch routing network 202 routes the instructions to the execution slices 204. In one embodiment, the processing system comprises an out of order machine. That is, instructions enter an instruction sequencing unit in order and exit the instruction sequencing unit out of order.

Each slice 204 includes one or more GPRs 206. In one embodiment, each slice includes 32 GPRs, but there could be any number of GPRs. When an instruction is dispatched from dispatch routing network 202, the general purpose registers 206 provide data for processing the instruction. For example, if an instruction is issued to add RA and RB, the GPRs provide RA and RB to an issue queue (not shown in FIG. 2), which stores the data in reservation station (ER) 210. The source data may be read before the instruction and data are sent to the issue queue. When the issue queue issues the instruction, the data is sent to its destination for processing, such as a vector scalar unit (VSU) or a load store unit (LSU). As an example, an LSU performs load/store operations on the data, while a VSU performs functions such as add, subtract, rotate, permute, etc. on the data. Results of these operations may be stored in GPRs 206, or stored in other components or processing system 200. Results may also be stored in other types of registers, such as vector registers (not illustrated).

As illustrated in the execution slices 204, data for instructions is transmitted to the reservation station 210. Data and instructions are sent to arithmetic logic unit (ALU) 212 if arithmetic operations are to be performed, such as add, subtract, rotate, etc. Results from ALU 212 can be sent to a result buffer 214, a multiplexer 216, the reservation station 210, or to another suitable component of execution slice 204, including back to the input of the ALU 212 for another operation. The arrows within slice 204 denote some of the paths for instructions and data to traverse within the slice. Results from execution slice 204 are sent to writeback busses 220, illustrated as eight lines at the bottom of FIG. 2. Results on the writeback busses 220 can be sent to an issue queue, GPRs 206, history buffer 208, or other locations in this execution slice or another slice. As one example, after an operation is performed by ALU 212, such as an add operation, the result is transmitted to a GPR 206 via writeback busses 220.

Each slice 204 has an associated history buffer 208. History buffers 208 back up data from GPRs 206 when a new instruction is dispatched and the data in the target register needs to be saved. The data is saved in history buffer 208 in case that data needs to be restored to GPRs 206 in the future. Data may be flushed from the GPRs 206 and need to be restored from history buffer 208 for a variety of reasons. One reason is branch mis-prediction, where a processing unit mis-predicts the next instruction to process in branch prediction. Other reasons for a flush include interrupts, load data misses, or data errors.

Occasionally, the data stored in a GPR 206 may contain an error. ECC bits can also be stored with the data in each GPR 206 to provide error detection and correction. In one embodiment, each GPR 206 stores 64 bits of data and 8 ECC bits, although any number of data and ECC bits may be used in other embodiments. The ECC bits are used to detect an error in the data stored in the GPR 206. In this embodiment, a single-bit error is recoverable. That is, an error correction process can detect the error, halt processing, correct the data, and restart the instruction stream again. In other embodiments, errors larger than a single-bit error may not be recoverable.

As described below, in some embodiments, the processor 200 can be configured to perform on-demand error detection and correction of GPRs. For example, upon detecting an error associated with a GPR 206, the processor 200 can determine whether to initiate an error correction process based on whether the GPR 206 has been completed. In cases where the GPR 206 has not been completed, the processor 200 can initiate a flush to restore (older) valid (or uncorrupted) data from the history buffer 208 back into the appropriate GPR 206. Doing so allows the processor to quickly proceed with re-executing instructions in the event of an error instead of initiating a time-consuming error scrubbing process to correct the GPRs 206s. In cases where the GPR 206 has been completed, the processor 200 can initiate an error correction process to scrub and fix the errors. In this case, the error correction process may involve restoring relevant data from the history buffer 208 back into the appropriate GPR 206 prior to performing a scrubbing process.

In one embodiment herein, errors are detected and an error correction process is initiated. During a flush associated with the error correction process, the history buffer 208 restores relevant data from history buffer 208 back into the appropriate GPR 206.

Figure 3:
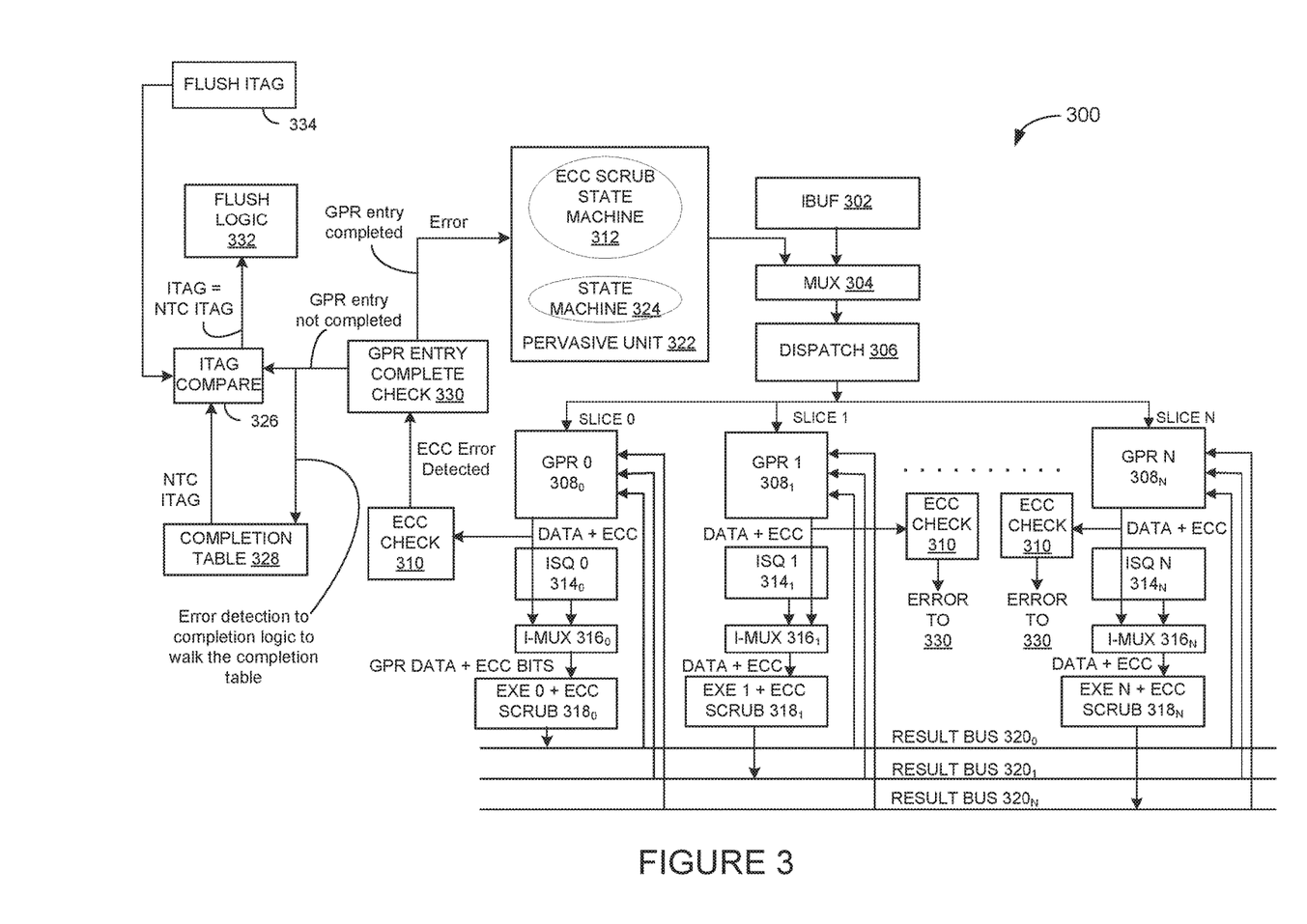
FIG. 3 further illustrates components of a multi-slice processor configured to perform on-demand error correction, according to one embodiment.

FIG. 3 illustrates an example flow 300 of an on-demand error detection process in an execution pipeline, according to one embodiment. FIG. 3 is a conceptual diagram, and (for the sake of clarity) does not illustrate each of the components of the execution slices shown in FIG. 2, but does illustrate additional components and/or processes. As a brief overview of the process, if an error in a GPR entry (e.g., GPR 308 data) is detected, the processor includes logic (e.g., a GPR entry completion check component 330) for determining if the GPR entry has been completed. If the GPR entry has already completed, then (each entry of) the GPR 308 is read out and scrubbed to fix the error. The GPR entry completion check component 330 sends an indication of the detected error to a pervasive unit 322 which initiates the error scrubbing process. However, if the GPR entry has not been completed, the GPR architected data is still in the history buffer 208A (not shown in FIG. 3 for the sake of clarity). In this case, the processor refrains from initiating an error correction process, and initiates a flush and restore of the history buffer to restore the GPR entry with uncorrupted data from the history buffer. Once the flush and restore process is completed, the processor may resume dispatch of instructions.

A more detailed description of the on-demand error correction process is described below. Flow 300 illustrates three example execution slices Slice0, Slice1, and SliceN. Any number of execution slices may be used by embodiments described herein. In one embodiment, as shown with respect to FIG. 2, eight execution slices are used in the processing core. An instruction buffer (or an instruction cache) 302 sends instructions to a multiplexer 304, which in turn forwards those instructions to dispatch 306. Dispatch 306 transmits each of the instructions to one of the execution slices for processing.

When an instruction is dispatched to an execution slice, source data for the instruction is read from the appropriate GPR 308 and sent to a reservation station (e.g., reservation station 210 as shown in FIG. 2, but not illustrated in FIG. 3 for the sake of clarity). GPR data is also checked against the ECC bits (stored with the GPR data in the GPR 308) for errors via ECC check 310. As shown in FIG. 3, GPR data+ECC bits ("DATA+ECC") are read from the GPR 308 and used by ECC check 310 in each execution slice to detect errors. If an error is detected in a slice, the GPR entry completion check component 330 is notified. Additionally, instruction fetch is stopped and the instruction associated with the error may be prevented from being dispatched to the issue queue.

The GPR entry completion check component 330 determines if the GPR entry has been completed. Typically, when an instruction has finished executing, it may be considered completed and may be retired. Completion of an instruction indicates that there may be no further exceptions requiring restore (such that depositing the results of the instruction will not violate the program order), and the state of the processor (e.g., defined by one or more RF entries) becomes the architected state. Thus, in an architected state any older result corresponding to a GPR entry stored in a history buffer is not needed. In some cases, a history buffer entry may remain valid until its evictor completes, because there may be a flush point between the history buffer entry and the evictor in the GPR, needing possible store. Thus, until the evictor completes and the state of the evictor GPR entry becomes the architected state, the previous history buffer entry may remain valid.

If the completion check component 330 determines the GPR entry has not been completed, the processor refrains from initiating the error correction process. Instead, the processor initiates a flush and restore of the history buffer to restore the data in the GPR entry to an un-corrupted state. The completion check component 330 saves the instruction tag (ITAG) of the instruction that read the corrupted GPR entry along with the ECC error indicator. The completion check component 330 sends the ITAG and the ECC error indicator to ITAG compare logic 326 (of a completion logic unit). The completion check component 330 also sends a request to the completion logic unit to slow down the completion rate and walk the completion table 328 to complete one instruction at a time. The next-to-complete (NTC) ITAG is also sent to the ITAG compare logic 326 to compare against the ITAG of the instruction that read the corrupted GPR data.

In one embodiment, the completion logic unit can also use the ITAG compare logic 326 (e.g., as an additional check after completion check 330) to make sure that the instruction that corrupted the GPR entry does not complete, as that will invalidate the previous result for the GPR entry in the history buffer, resulting in the processor having to perform a full scrubbing of all the entries of the GPR. Thus, if completion can be stopped such that the instruction that has the corrupted data does not complete, then the processor can determine that the data in the history buffer is still valid, and still initiate a flush-restore procedure from the history buffer (e.g., as opposed to a time-consuming scrubbing process). Thus, as shown, the ITAG compare logic 326 can compare the ITAG (of the instruction that corrupted the GPR entry) and NTC ITAG and determine whether there is a match. If there is match, then the completion unit may determine that the corrupted GPR data belongs to the oldest instruction in the processor and can be restored. Based on this determination, the completion logic unit can then generate a flush request and send the flush request to flush logic 332. Upon receiving the flush request, flush logic 332 may initiate a history buffer flush and restore process in order to read out the uncorrupted GPR data from the history buffer and write it back to the GPR entry. Once the history buffer flush and restore process is completed, the dispatch of instructions can resume.

Additionally, in some embodiments, the ITAG of the instruction that has corrupted GPR data can snoop the flush ITAG 334. For example, the ITAG compare logic 326 can compare the flush ITAG with the ITAG of the instruction and determine if they match. If the flush ITAG matches this ITAG, then the instruction can be flushed out. In this case, the ITAG of the corrupted GPR entry can be cleared out to indicate that no ECC error is pending. The normal flush and restore process of the history buffer can then proceed to restore uncorrupted data from the history buffer into the GPR entry. Allowing the processor to refrain from performing an error correction process even in situations where an error is detected can significantly reduce the amount of time that the processor pipeline is stalled (e.g., prevented from fetching and processing instructions) when errors are detected.

On the other hand, if the completion check component 330 determines the GPR entry has already been completed, the processor may proceed to initiate an error correction process to correct the errors. In such situations, for example, the valid architected data that is associated with GPR entry may no longer be present in the history buffer. The completion check component 330 may therefore initiate a process to read out the entire register file (e.g., GPR 308) and scrub the GPR to fix the error. For example, each slice may include 32 GPRs in one embodiment.

As shown, the completion check component 330 sends an indication of the error to the pervasive unit 322. The pervasive unit 322 is a unit that accomplishes various tasks for various other units in a processor, one example of which includes an error correction process. The first task for the pervasive unit 322 is to flush out the threads. Pervasive unit 322 requests a flush to flush out all threads that are in process in the execution slice where the error was detected. Flushing the threads restores the relevant data from the history buffers to the respective GPRs 308. The other execution slices may continue to execute if an error has not been detected in those respective slices.

After the history buffer flush and restore process is complete, the pervasive unit 322 initiates a special state machine 324 to read out GPR entries to send to the ECC scrubber state machine 312. ECC scrubber state machine 312 generates pseudo-instructions to read out the data from each GPR 308. Pseudo-instructions are instructions without ITAGs. In general, instructions have ITAGs, and a completion unit uses the ITAGs to track which instructions have and have not been completed. Issue queue 314 also tracks instructions with the use of ITAGs. Pseudo-instructions do not need these ITAGs. Pseudo-instructions are not recognized by the completion unit but are recognized by other units, such as an ALU. Therefore, these pseudo-instructions are not put into a completion buffer by the completion unit for processing. Allowing these pseudo-instructions to be processed without the involvement of the completion unit simplifies the implementation of the embodiments described herein.

The ECC scrubber state machine 312 generates one pseudo-instruction for each GPR 308 location. For example, 32 pseudo-instructions are generated for an execution slice to move the GPR data if the GPR 308 includes 32 registers. Each pseudo-instructions has the same source register as destination register. In other words, the pseudo-instruction will read the data stored in GPR 5 (the source register), for example, and the result of the pseudo-instruction will also be placed into GPR 5 (the destination register). Therefore, after ECC correction is performed on the data, the data is written back to the same GPR location.

The pseudo-instructions are dispatched to read out a GPR 308 entry. As noted above, however, the pseudo-instructions may not write into the completion table. Instead, the GPR data may be placed in the RA source register, and its associated ECC data may be placed on RB or RC source register. The RT destination register is the same as the RA source register. Once the GPR 308 entry is read, the pseudo-instructions send the GPR data to the issue queue (ISQ 314). ISQ 314, however, does not write the pseudo-instruction and GPR data into the issue queue. Instead, it uses issue bypass to route the pseudo-instruction and the GPR data and ECC data to an execution unit (such as a VSU). Such an issue bypass is illustrated in FIG. 3. An arrow from the bottom of each GPR 308 is shown that bypasses the issue queue 314 and transmits the data directly to an issue multiplexer 316. As noted above, bypassing the issue queue simplifies the process for error correction.

Issue multiplexer 316 transmits the data and pseudo-instruction to an execution unit. As shown in FIG. 3, an execution unit performs an ECC scrubbing process in block 318. A VSU can perform the ECC scrubbing process in certain embodiments. The VSU may include an error corrector mechanism or error corrector logic. The VSU decodes the pseudo-instruction, and recognizes that the pseudo-instruction is a request to perform error correction. The VSU can send the GPR data along with the ECC bits to the ECC scrubbing state machine 312 in pervasive unit 322 to fix the data with the appropriate error correction processes.

After the GPR data has been corrected, the resulting GPR data is placed on the result bus 320 and routed to the GPRs 308, as illustrated by the arrows from result bus 320 to GPR 308 in FIG. 3. The corrected data is written to the appropriate destination register. The above steps can then be repeated for all GPR entries (e.g., 32 GPR entries in each thread in one embodiment).

Because the pseudo-instruction was never written into a completion table by the ISQ 314, the ISQ 314 does not have to finish or complete the pseudo-instruction. As noted above, this simplifies the implementation of the embodiments described herein. When all GPRs 308 are fixed with the ECC scrubber state machine 312, the processor core can resume fetching instructions from the flushed point.

Figure 4:
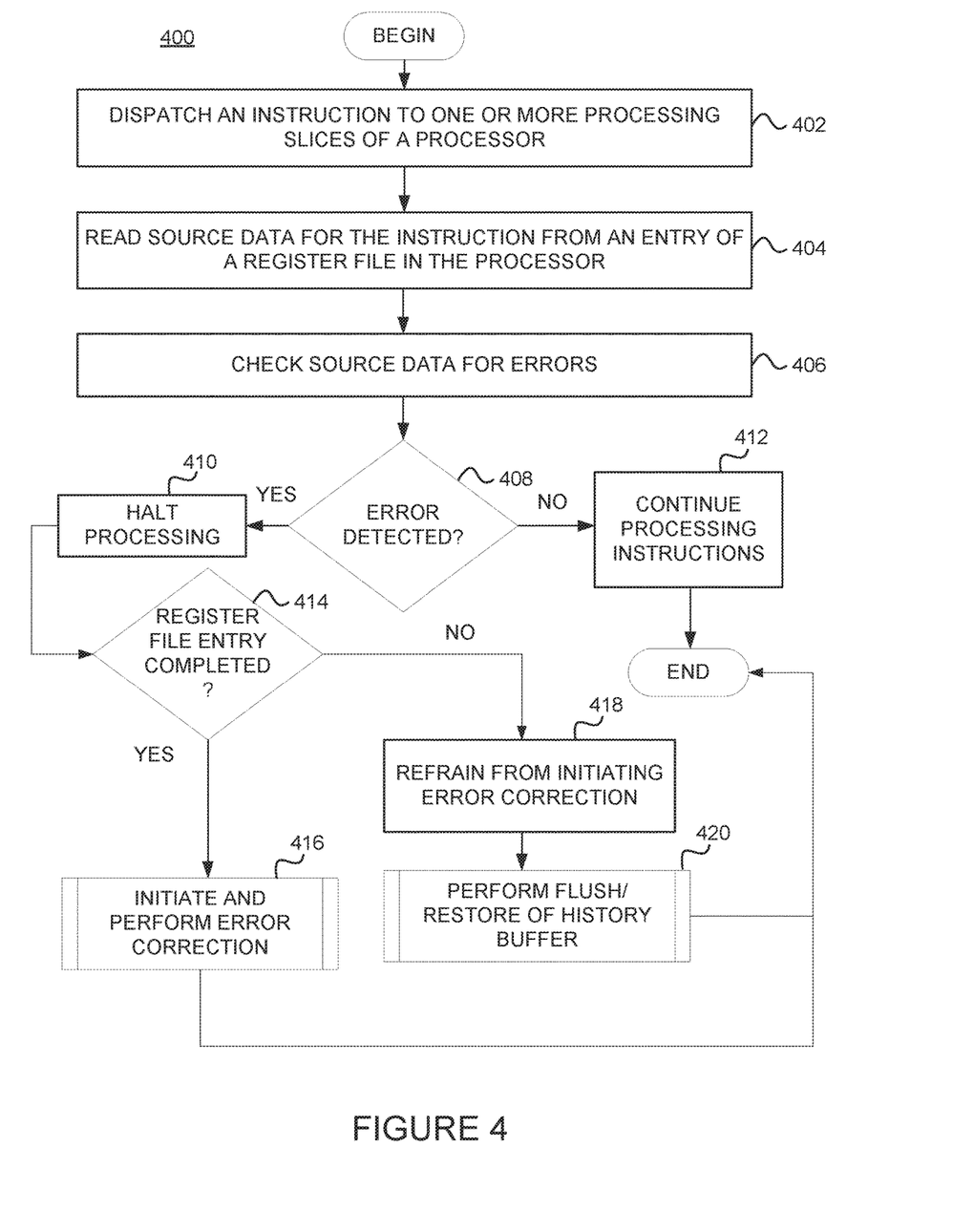
FIG. 4 is a flow chart illustrating a method for performing on-demand error detection and correction in a processor, according to one embodiment.

FIG. 4 is a flow chart illustrating a method 400 for performing on-demand error correction in a processor, according to one embodiment. Although the method steps are described in conjunction with the systems of FIGS. 1-3, persons skilled in the art will understand that any system configured to perform the method steps, in any suitable order, falls within the scope of the present invention. In various embodiments, the hardware and/or software elements described above in FIGS. 1-3 can be configured to perform the method steps of FIG. 4. For example, in one embodiment, the processor (e.g., processing system 200) or one or more components of the processor can perform the method 400.

As shown, the method 400 begins at block 402, where the processor dispatches an instruction (e.g., in one or more execution slices of the processor). After dispatch, source data for the instruction is read from an entry of the register file (e.g., GPRs 308) in the processor (block 404). At block 406, the processor checks the source data stored in the register file entry for errors. In one embodiment, the processor can detect the error by using an error detection algorithm on the ECC bits. However, in general, any suitable method of error detection can be used. An ECC check unit or module 310 may perform the ECC check to detect the error. If, at block 408, the processor determines there is no error associated with the data from the register file entry, the processor can continue the dispatch of the instruction (e.g., to an issue queue) and/or fetch a new instruction (e.g., from an instruction cache) (block 412).

On the other hand, if, at block 408, the processor determines there is an error associated with the data from the register file entry, the processor, at block 410, halts processing in the pipeline of the execution slice. For example, in one embodiment, the fetch of new instruction may be halted and/or the instruction associated with the corrupted data may be prevented from being sent to the issue queue in the execution slice. At block 414, the processor determines whether the register file entry has been completed. If so, the processor initiates and performs an error correction process (block 416). If the processor determines the register file entry has not been completed, the processor refrains from initiating error correction (block 418) and performs a flush/restore of the history buffer to move uncorrupted data from the relevant history buffer entry to the register file entry (block 420). The method then ends.

Figure 5:
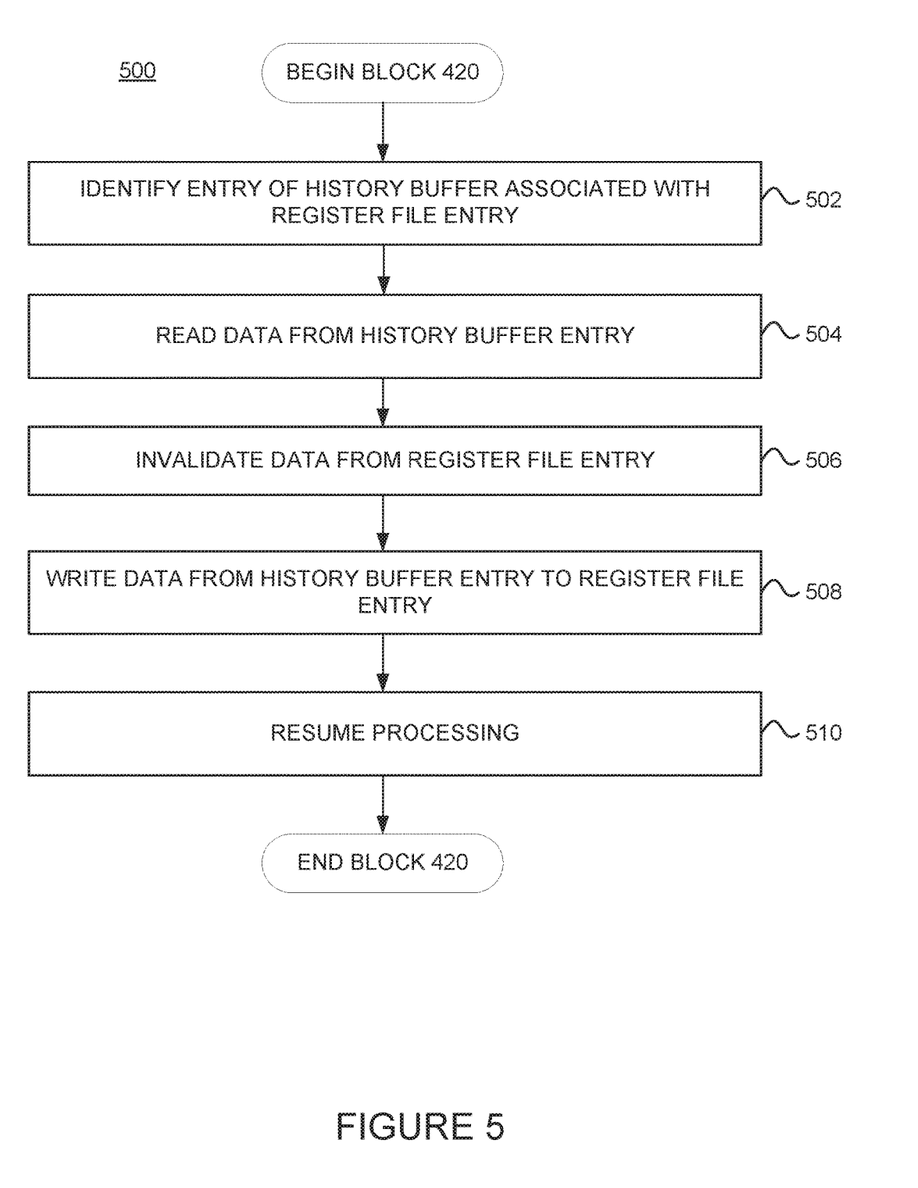
FIG. 5 is a flow chart illustrating a method for restoring data from a history buffer, according to one embodiment.

FIG. 5 is a flow chart illustrating a method 500 for restoring a register file entry from a history buffer in the event of detecting an error in the register file entry, according to one embodiment. Although the method steps are described in conjunction with the systems of FIGS. 1-3, persons skilled in the art will understand that any system configured to perform the method steps, in any suitable order, falls within the scope of the present invention. In various embodiments, the hardware and/or software elements described above in FIGS. 1-3 can be configured to perform the method steps of FIG. 5. For example, in one embodiment, the processor (e.g., processing system 200) or one or more components of the processor can perform the method 500.

Method 500 begins when the processor determines to perform a flush/restore of the history buffer (e.g., block 420 of FIG. 4). At block 502, the processor identifies an entry of the history buffer that is associated with the register file entry. For example, as described above, the processor can identify the relevant history buffer entry based on the ITAG of the instruction that read the corrupted data, NTC ITAG (from the completion table) and/or the flush ITAG. At block 504, the processor reads the uncorrupted data from the history buffer entry. At block 506, the processor invalidates the corrupted data from the register file entry. At block 508, the processor writes the uncorrupted data from the history buffer entry to the register file entry.

At block 510, the processor can resume processing. For example, in one embodiment, the processor may resume the dispatch of the instruction (previously associated with the corrupted data) to the issue queue. In some embodiments, the processor may flush the instruction that read the corrupted data, e.g., based on a comparison of the flush ITAG and the ITAG that read the corrupted data). If the flush ITAG and this ITAG match, the processor can invalidate the instruction and clear out the ITAG to indicate that no ECC error is pending. The method 500 then ends.

Figure 6:
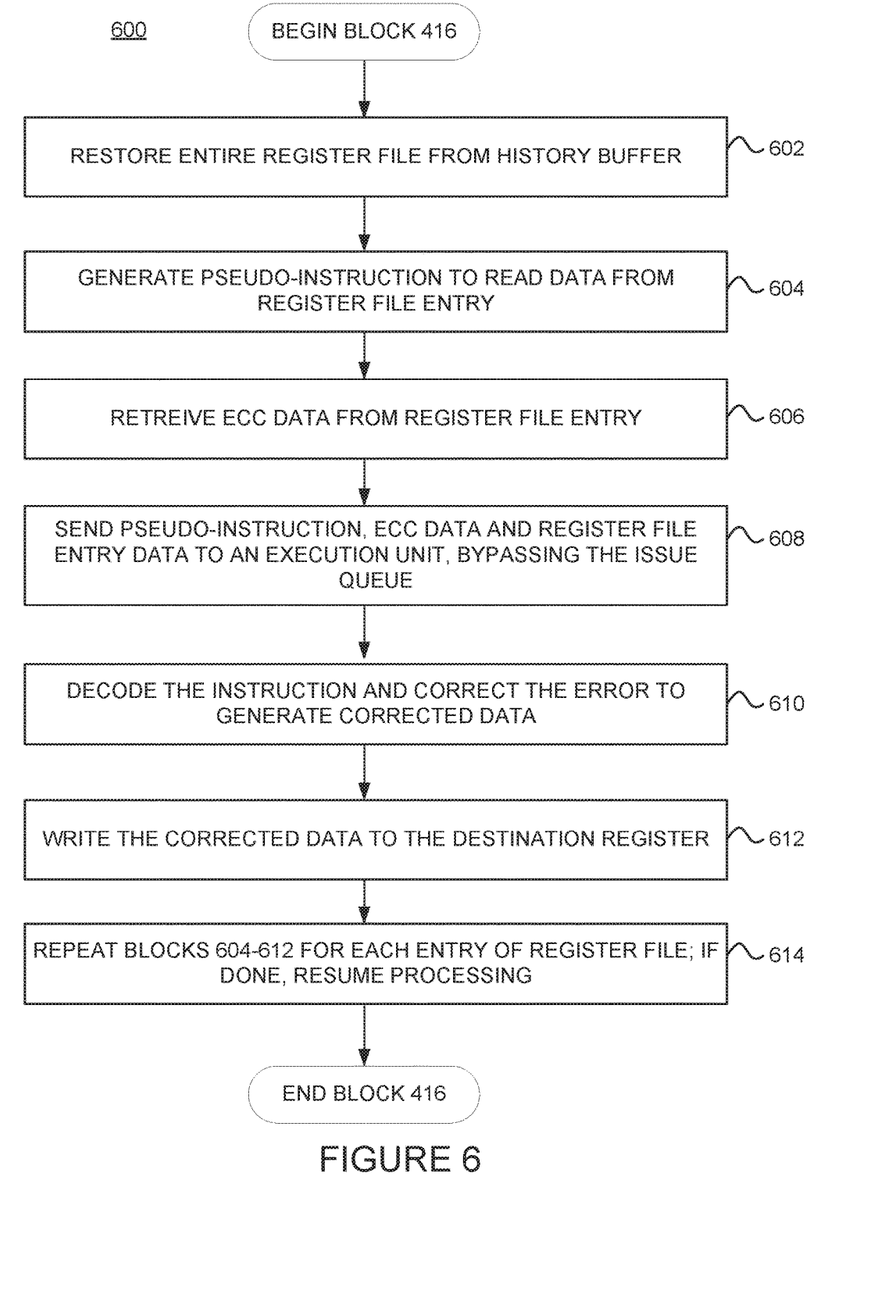
FIG. 6 is a flow chart illustrating a method for performing error correction, according to one embodiment.

FIG. 6 is a flow chart illustrating a method 600 for performing an error correction process in a processor, according to one embodiment. Although the method steps are described in conjunction with the systems of FIGS. 1-3, persons skilled in the art will understand that any system configured to perform the method steps, in any suitable order, falls within the scope of the present invention. In various embodiments, the hardware and/or software elements described above in FIGS. 1-3 can be configured to perform the method steps of FIG. 6. For example, in one embodiment, the processor (e.g., processing system 200) or one or more components of the processor can perform the method 600.

Method 600 begins when the processor determines to initiate and perform error correction (e.g., block 416 of FIG. 4). At block 602, the processor flushes and restores the entire register file from the history buffer. For example, the processor can flush the data from each entry of the register file and restore each entry of the register file with data from the history buffer, such as history buffer 208 illustrated in FIG. 2. This step restores relevant data from the history buffer to the register file.

At block 604, the processor generates a pseudo-instruction to read data from the register file entry. As noted above, the processor may generate a pseudo-instruction (e.g., an instruction without an ITAG) for each entry of the register file (e.g., if there 32 entries, 32 pseudo-instructions are generated). Each pseudo-instruction has the same source register as destination register. This allows the instruction to read data from the register and write the corrected data back to the same register after error correction.

At block 606, the processor retrieves ECC data from the register file entry. The processor sends the pseudo-instruction, ECC data and register file entry data to an execution unit, bypassing the issue queue (block 608). For example, in one embodiment, the pseudo-instruction can instruct the issue queue to route the instruction along with the register file entry data and ECC data to the execution unit.

At block 610, the processor (e.g., via the execution unit) decodes the instruction and corrects the error to generate corrected data. The execution unit may use any suitable error correcting mechanism to correct the error. Once corrected, the execution unit writes the corrected data to the destination register (e.g., via results bus 320). The processor may then repeat blocks 604-612 until each entry in the register file has been error corrected (block 614). Once done, the processor can resume processing by fetching a next instruction from an instruction cache or instruction buffer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for on-demand error correction in a processor, comprising:
    detecting, before a first instruction is dispatched to an issue queue in the processor, an error in data, associated with the first instruction, stored in an entry of a register file in the processor;
    after detecting the error,
       halting the dispatch of the first instruction to the issue queue; and
       determining whether the entry of the register file has completed; and
    determining whether to perform error correction on the register file based on the determination of whether the entry of the register file has completed.

2. The method of claim 1, wherein determining whether the entry of the register file has completed comprises determining the entry of the register file has not completed, and wherein determining whether to perform error correction on the register file comprises determining to refrain from performing error correction on the register file.

3. The method of claim 2, wherein after determining to refrain from performing error correction, the method further comprising:
identifying an entry of a history buffer in the processor that is associated with the entry of the register file;
invalidating the data from the entry in the register file; and
restoring the entry in the register file with data from the entry of the history buffer.

4. The method of claim 3, further comprising resuming the dispatch of the first instruction to the issue queue after restoring the entry in the register file.

5. The method of claim 1, wherein determining whether the entry of the register file has been completed comprises determining the entry of the register file has completed, and wherein determining whether to perform error correction on the register file comprises determining to perform error correction on the register file.

6. The method of claim 5, wherein after determining to perform error correction, the method further comprising:
generating a second instruction without an instruction tag (ITAG) to read the data from the entry of the register file, wherein the entry of the register file comprises a source entry and destination entry of the second instruction;
retrieving error correcting code (ECC) data from the entry of the register file;
dispatching the second instruction, data and ECC data to an execution unit in the processor, wherein the second instruction, data and ECC data bypasses the issue queue in the processor;
after decoding the second instruction at the execution unit, correcting the error to generate corrected data; and
writing the corrected data to the destination entry of the register file.

7. The method of claim 6, further comprising:
before dispatching the second instruction, invalidating data in each entry of the register file and restoring each entry of the register file with data from corresponding entries in the history buffer.

8. The method of claim 6, further comprising:
halting the processor from fetching a second instruction from an instruction cache in the processor after detecting the error; and
fetching the second instruction after writing the corrected data.

9. A system, comprising:
a processor; and
a memory storing a program, which, when executed on the processor, performs an operation for on-demand error correction in the processor, the operation comprising:
detecting, before a first instruction is dispatched to an issue queue in the processor, an error in data, associated with the first instruction, stored in an entry of a register file in the processor;
after detecting the error,
halting the dispatch of the first instruction to the issue queue; and
determining whether the entry of the register file has completed; and
determining whether to perform error correction on the register file based on the determination of whether the entry of the register file has completed.

10. The system of claim 9, wherein determining whether the entry of the register file has completed determining the entry of the register file has not completed, and wherein determining whether to perform error correction on the register file comprises determining to refrain from performing error correction on the register file.

11. The system of claim 10, wherein after determining to refrain from performing error correction, the operation further comprising:
identifying an entry of a history buffer in the processor that is associated with the entry of the register file;
invalidating the data from the entry in the register file; and
restoring the entry in the register file with data from the entry of the history buffer.

12. The system of claim 11, the operation further comprising resuming the dispatch of the first instruction to the issue queue after restoring the entry in the register file.

13. The system of claim 9, wherein determining whether the entry of the register file has completed comprises determining the entry of the register file has completed, and wherein determining whether to perform error correction on the register file comprises determining to perform error correction on the register file.

14. The system of claim 13, wherein after determining to perform error correction, the operation further comprising:
generating a second instruction without an instruction tag to read the data from the entry of the register file, wherein the entry of the register file comprises a source entry and destination entry of the second instruction;
retrieving error correcting code (ECC) data from the entry of the register file;
dispatching the second instruction, data and ECC data to an execution unit in the processor, wherein the second instruction, data and ECC data bypasses the issue queue in the processor;
after decoding the second instruction at the execution unit, correcting the error to generate corrected data; and
writing the corrected data to the destination entry of the register file.

15. The system of claim 14, the operation further comprising:
before dispatching the second instruction, invalidating data in each entry of the register file and restoring each entry of the register file with data from corresponding entries in the history buffer.

16. A computer program product, comprising:
a non-transitory computer-readable storage medium having computer-readable program code embodied therewith, the computer-readable program code configured to perform an operation for on-demand error correction in a processor, the operation comprising:
detecting, before a first instruction is dispatched to an issue queue in the processor, an error in data, associated with the first instruction, stored in an entry of a register file in the processor;
after detecting the error,
halting the dispatch of the first instruction to the issue queue; and
determining whether the entry of the register file has completed; and
determining whether to perform error correction on the register file based on the determination of whether the entry of the register file has completed.

17. The computer program product of claim 16, wherein determining whether the entry of the register file has completed comprises determining the entry of the register file has not completed, and wherein determining whether to perform error correction on the register file comprises determining to refrain from performing error correction on the register file.

18. The computer program product of claim 17, wherein after determining to refrain from performing error correction, the operation further comprising:
    identifying an entry of a history buffer in the processor that is associated with the entry of the register file;
    invalidating the data from the entry in the register file;
    restoring the entry in the register file with data from the entry of the history buffer; and
    resuming the dispatch of the first instruction to the issue queue after restoring the entry in the register file.

19. The computer program product of claim 16, wherein determining whether the entry of the register file has been completed comprises determining the entry of the register file has completed, and wherein determining whether to perform error correction on the register file comprises determining to perform error correction on the register file.

20. The computer program product of claim 19, wherein after determining to perform error correction, the operation further comprising:
    generating a second instruction without an instruction tag to read the data from the entry of the register file, wherein the entry of the register file comprises a source entry and destination entry of the second instruction;
    retrieving error correcting code (ECC) data from the entry of the register file;
    dispatching the second instruction, data and ECC data to an execution unit in the processor, wherein the second instruction, data and ECC data bypasses the issue queue in the processor;
    after decoding the second instruction at the execution unit, correcting the error to generate corrected data; and
    writing the corrected data to the destination entry of the register file.

* * * * *